United States Patent
Yong et al.

(10) Patent No.: US 8,280,445 B2
(45) Date of Patent: Oct. 2, 2012

(54) SYSTEM AND METHOD FOR ANTENNA TRAINING OF BEAMFORMING VECTORS BY SELECTIVE USE OF BEAM LEVEL TRAINING

(75) Inventors: Su Khiong Yong, Santa Clara, CA (US); Huai-Rong Shao, Santa Clara, CA (US); Xiangping Qin, Carbondale, IL (US); Pengfei Xia, San Diego, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 918 days.

(21) Appl. No.: 12/362,407

(22) Filed: Jan. 29, 2009

(65) Prior Publication Data

US 2009/0238156 A1 Sep. 24, 2009

Related U.S. Application Data

(60) Provisional application No. 61/028,467, filed on Feb. 13, 2008.

(51) Int. Cl.
 *H04M 1/00* (2006.01)
(52) U.S. Cl. .............. 455/562.1; 455/69; 455/452.2; 455/575.7; 455/63.3; 455/63.1; 455/500; 455/276.1; 370/336; 370/328; 370/345; 370/329
(58) Field of Classification Search ........... 455/562.1, 455/452.2, 69, 276.1, 575.7, 63.3, 101, 500, 455/63.1
See application file for complete search history.

(56) References Cited

U.S. PATENT DOCUMENTS

| | | |
|---|---|---|
| 5,955,991 A | 9/1999 | Kawakubo |
| 6,181,276 B1 | 1/2001 | Schlekewey et al. |
| 6,334,197 B1 | 12/2001 | Eroz et al. |
| 6,590,532 B1 | 7/2003 | Ogawa et al. |
| 6,721,908 B1 | 4/2004 | Kim et al. |

(Continued)

FOREIGN PATENT DOCUMENTS

EP 1267501 A 12/2002

(Continued)

OTHER PUBLICATIONS

U.S. Notice of Allowance for U.S. Appl. No. 12/264,111 mailed Jul. 11, 2011.

(Continued)

*Primary Examiner* — Marceau Milord
(74) *Attorney, Agent, or Firm* — Kenneth L. Sherman, Esq.; Michael Zarrabian, Esq.; Sherman & Zarrabian LLP

(57) ABSTRACT

A system and method of performing a beam discovery between a device and a plurality of other devices in a wireless network is disclosed. Sector training sequences to a plurality of other devices are transmitted via a transmit directional antenna having a set of transmit sectors. A plurality of feedback messages are received from the plurality of other devices, where the plurality of feedback messages are indicative of optimum transmit sectors that have been determined at the other devices based at least in part on the sector training sequences. Beam training sequences are transmitted to the plurality of other devices via the transmit directional antenna. A plurality of feedback message indicative of optimum transmit beam directions within the optimum transmit sectors are received from the plurality of other devices.

51 Claims, 8 Drawing Sheets

U.S. PATENT DOCUMENTS

| | | |
|---|---|---|
| 6,731,689 B2 | 5/2004 | Dogan |
| 6,795,392 B1 | 9/2004 | Li et al. |
| 6,847,832 B2 | 1/2005 | Wong et al. |
| 6,937,189 B2 | 8/2005 | Kim |
| 7,013,165 B2 | 3/2006 | Yoon et al. |
| 7,039,370 B2 | 5/2006 | Laroia et al. |
| 7,161,534 B2 | 1/2007 | Tsai et al. |
| 7,239,893 B2 | 7/2007 | Yang |
| 7,245,939 B2 | 7/2007 | Goldberg |
| 7,312,750 B2 | 12/2007 | Mao et al. |
| 7,342,535 B2 | 3/2008 | Ann et al. |
| 7,426,232 B2 | 9/2008 | Matsuoka et al. |
| 7,450,659 B2 | 11/2008 | Corredoura et al. |
| 7,522,555 B2 * | 4/2009 | Li et al. ............ 370/329 |
| 7,620,420 B2 * | 11/2009 | Higuchi et al. ............ 455/562.1 |
| 7,640,462 B2 | 12/2009 | Lin |
| 7,643,794 B2 * | 1/2010 | Ofek et al. ............ 455/25 |
| 7,904,117 B2 | 3/2011 | Doan et al. |
| 7,916,081 B2 | 3/2011 | Lakkis |
| 7,929,918 B2 * | 4/2011 | Niu et al. ............ 455/69 |
| 7,953,372 B2 * | 5/2011 | Ofek et al. ............ 455/63.4 |
| 7,990,942 B2 * | 8/2011 | Taira et al. ............ 370/345 |
| 8,024,001 B2 * | 9/2011 | Iacono et al. ............ 455/562.1 |
| 8,051,037 B2 * | 11/2011 | Xia et al. ............ 707/617 |
| 8,164,521 B2 * | 4/2012 | Lee et al. ............ 342/407 |
| 8,165,595 B2 * | 4/2012 | Xia et al. ............ 455/452.2 |
| 8,175,532 B2 * | 5/2012 | Nanda et al. ............ 455/63.4 |
| 2002/0122498 A1 | 9/2002 | Dogan |
| 2002/0147032 A1 | 10/2002 | Yoon et al. |
| 2003/0201936 A1 | 10/2003 | Kim |
| 2004/0218581 A1 | 11/2004 | Cattaneo |
| 2005/0037799 A1 | 2/2005 | Braun et al. |
| 2005/0068231 A1 | 3/2005 | Regnier et al. |
| 2005/0206564 A1 | 9/2005 | Mao et al. |
| 2005/0276347 A1 | 12/2005 | Mujtaba et al. |
| 2006/0012520 A1 | 1/2006 | Tsai et al. |
| 2006/0104382 A1 | 5/2006 | Yang et al. |
| 2006/0234645 A1 | 10/2006 | Lin et al. |
| 2006/0248429 A1 | 11/2006 | Grandhi et al. |
| 2006/0279460 A1 | 12/2006 | Yun et al. |
| 2007/0189412 A1 | 8/2007 | Xia et al. |
| 2007/0205943 A1 | 9/2007 | Nassiri-Toussi et al. |
| 2007/0249402 A1 | 10/2007 | Dong et al. |
| 2008/0094281 A1 | 4/2008 | Teng et al. |
| 2008/0101493 A1 | 5/2008 | Niu et al. |
| 2008/0108390 A1 | 5/2008 | Yoon et al. |
| 2008/0134254 A1 | 6/2008 | Xia et al. |
| 2008/0144751 A1 | 6/2008 | Xia et al. |
| 2008/0204319 A1 | 8/2008 | Niu et al. |
| 2008/0285667 A1 | 11/2008 | Mondal et al. |
| 2009/0033555 A1 | 2/2009 | Niu et al. |
| 2009/0046010 A1 | 2/2009 | Niu et al. |
| 2009/0046012 A1 | 2/2009 | Niu et al. |
| 2009/0047910 A1 | 2/2009 | Niu et al. |
| 2009/0058724 A1 | 3/2009 | Xia et al. |
| 2009/0121935 A1 | 5/2009 | Xia et al. |
| 2009/0189812 A1 | 7/2009 | Xia et al. |
| 2009/0193300 A1 | 7/2009 | Xia et al. |
| 2010/0009635 A1 | 1/2010 | Qin et al. |

FOREIGN PATENT DOCUMENTS

| | | |
|---|---|---|
| JP | 2004/140642 A2 | 5/2004 |
| KR | 2000/0071545 A | 11/2000 |
| KR | 2001/0015765 | 2/2001 |
| KR | 2001/0018995 A | 3/2001 |
| KR | 2002/0022109 A | 3/2002 |
| KR | 2006/0068921 A | 6/2006 |
| WO | WO 01/17131 | 3/2001 |
| WO | WO 03/090386 | 10/2003 |

OTHER PUBLICATIONS

U.S. Non-Final Office Action for U.S. Appl. No. 12/264,100 mailed Jul. 21, 2011.
"Wireless Medium Access Control (MAC) and Physical Layer (PHY) Specifications for High Rate Wireless Personal Area Networks (WPANs)", IEEE Std 802.15.3 (Sep. 29, 2003).
Working Group for Wireless Personal Area Networks (WPANs) IEEE P802.15 (Jan. 15, 2008).
Butler et al., "Beam-Forming Matrix Simplifies Design of Electronically Scanned Antennas." Electronic Design, Apr. 12, 1961, pp. 170-173.
Buzzi S. et al., Performance of iterative data detection and channel estimation for single-antenna and multiple-antennae wireless communications, IEEE Transactions on Vehicular Technology, Jul. 2004, 53(4): 1085-1104.
Gaetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf] , pp. 1-6.
Coffey, S. et al., "Joint Proposal: High throughput extension to the 802.11 Standard: PHY" IEEE 802.11-05/1102r4, draft proposal, Jan. 2006, pp. 1-82.
De Los Santos, "MEMS-Based Microwave Circuits and Systems, Introduction to Microelectromechanical (MEM) Microwave Systems," Artech House, p. 167-168 and 193, 1999.
Furrer et al., Bounds on the ergodic capacity of training-based multiple-antenna systems, Proceedings, Internal Symposium on Information Theory, ISIT, Sep. 2005, p. 780-784.
Hachman, "CE Giants back Amimon's Wireless HDTV Tech," online: www.pcmag.com, 1 page, Jul. 23, 2008.
Hansen, R.C., Phased Array Antennas, John Wiley and Songs, New York, 1998, pp. 1-507.
Hitachi et al., High-Definition Multimedia Interface (HDMI) Specifications version 1.2, Aug. 22, 2005, pp. 1-214.
IEEE 802.11 Working Group of the 802 Committee, "Draft Amendment to Standard for Information Technology—Telecommunications and information exchange between systems—Local and metropolitan are networks—Specific requirements—Part 11: Wireless LAN Medium Access Control (MAC) and Physical Layer (PHY) specifications: Enhancements for Higher Throughput," IEEE P802.11n/D1.0, Mar. 2006, pp. 1-335.
LG Electronics Inc., WirelessHD Specification Version 1.0 Overview, Oct. 9, 2007, 77 pages.
Lin et al., Error Control Coding—Fundamentals and Applications, 2nd Edition, Pearson Prentice Hall, 2004, Chapter 16, pp. 774-780.
NEC develops compact millimeter-wave transceiver for uncompressed HDTV signal transmission, NE Asia Online, Apr. 5, 2005, (Downloaded from http://neasia.nikkeibp.com/topstory/000913 on Sep. 29, 2006).
Niu et al., "Beamforming for Space-Time Coded IEEE 802.11n System with Known Fading Correlations," in Proceeding of 39th Asilomar Conference on Signals, Systems and Computers, Pacific Grove, CA, Nov. 2005.
Razavi, B., "Challenges in Portable RF Transceiver Design." Circuits & Devices, 8755-3996/96, IEEE, Sep. 1996, pp. 12-24.
Rye et al., on Quadratic Inverses for Quadratic Permutation Polynomials Over Integer Rings, IEEE Trans. on Information Theory, Mar. 2006, 52(3): 1-12.
Scintera, "Advanced Signal Processing Platform," Scintera Networks, Sep. 2003, pp. 1-9.
Stüber, G. et al., "Broadband MIMO-OFDM Wireless Communications", Proceedings of the IEEE, vol. 92, No. 2, Feb. 2004, pp. 271-294.
Takeshita et al., On Maximum Contention-Free Interleavers and Permutation Polynomials Over Integer Rings, IEEE Trans. on Information Theory, Mar. 2006, 52(3): 1-13.
Van Veen et al., Beamforming: A Versatile Approach to Spatial Filtering, IEEE ASSP Magazine, Apr. 1988, 5(2): 4-24.
International Search Report and Written Opinion dated Aug. 28, 2009 for PCT/KR2009/000365, filed Jan. 23, 2009.
International Search Report dated Jun. 29, 2009 for PCT Application No. PCT/KR2009/000373, filed Jan. 23, 2009.
International Search Report dated Sep. 16, 2009 for PCT Application No. PCT/KR2009/00576, filed Feb. 6, 2009.
U.S. Office Action dated Jun. 23, 2008 in U.S. Appl. No. 11/890,207, filed Aug. 2, 2007.
U.S. Office Action dated Nov. 24, 2008 in U.S. Appl. No. 11/890,207, filed Aug. 2, 2007.

U.S. Advisory Action dated Mar. 2, 2009 in U.S. Appl. No. 11/890,207, filed Aug. 2, 2007.

U.S. Office Action dated Apr. 6, 2009 in U.S. Appl. No. 11/890,207, filed Aug. 2, 2007.

U.S. Office Action dated Jul. 25, 2008 in U.S. Appl. No. 11/881,978, filed Jul. 30, 2007.

U.S. Office Action dated Jan. 2, 2009 in U.S. Appl. No. 11/881,978, filed Jul. 30, 2007.

U.S. Notice of Allowance dated Sep. 15, 2009 in U.S. Appl. No. 11/881,978, filed Jul. 30, 2007.

U.S. Office Action dated Sep. 24, 2009 in U.S. Appl. No. 11/899,286, filed Sep. 5, 2007.

U.S. Notice of Allowance dated Jan. 21, 2010 in U.S. Appl. No. 11/899,286, filed Sep. 5, 2007.

U.S. Office Action dated Oct. 15, 2009 in U.S. Appl. No. 11/706,942, filed Feb. 13, 2007.

U.S. Non-Final Office Action for U.S. Appl. No. 12/264,111 mailed Mar. 15, 2011.

Supplementary European Search Report dated Nov. 22, 2011 for European Application No. EP 09704850.8 from European Patent Office, pp. 1-9, Munich, Germany.

Takeshita, O.Y. et al., "New Deterministic Interleaver Designs for Turbo Codes," IEEE Transactions on Information Theory, Sep. 2000, pp. 1988-2006, vol. 46, No. 6, IEEE, United States.

European Telecommunications Standards Institute, "Terrestrial Trunked Radio (TETRA); Release 2; Designer's Guide; TETRA High-Speed Data (HSD); TETRA Enhanced Data Service (TEDS)," Draft Technical Report ETSI TR 102 580, Version 1.1.1, Sep. 2007, pp. 1-190, European Telecommunications Standards Institute (ETSI), France.

U.S. Notice of Allowance for U.S. Appl. No. 12/264,100 mailed Jan. 4, 2012.

* cited by examiner

SYSTEM AND METHOD FOR ANTENNA TRAINING OF BEAMFORMING VECTORS BY SELECTIVE USE OF BEAM LEVEL TRAINING

CROSS-REFERENCE TO RELATED APPLICATIONS

This application claims priority from U.S. Provisional Patent Application No. 61/028,467, filed on Feb. 13, 2008, which is incorporated herein by reference. This application is related to a copending application entitled SYSTEM AND METHOD FOR MULTI-STAGE ANTENNA TRAINING OF BEAMFORMING VECTORS, application Ser. No. 12/264,100, which has been filed on Nov. 3, 2008, the entire disclosure of which is hereby incorporated by reference.

BACKGROUND OF THE INVENTION

1. Field of the Invention

The present invention relates to wireless transmission in a wireless network, and in particular, to an antenna sector discovery between devices using directional antennas in a wireless personal area network (WPAN).

2. Description of the Related Technology

Beam discovery (e.g., sector discovery or beamforming) is the first step before exchanging data using directional antennas (or antenna arrays). In IEEE 802.15-08-0055-01-003c ("mm Wave Beamforming", Submissions to IEEE 802.15.3c meeting Jan. 15, 2008), the beam discovery procedure requires beamforming at all beams in each sector. Consequently, the beam discovery process takes a long time to complete.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly.

In one embodiment, there is a method of performing a beam discovery between a device and a plurality of other devices in a wireless network, the method comprising performing a coarse level training comprising: a) transmitting a sector training sequence via a transmit directional antenna, wherein either the transmit directional antenna or each of a plurality of receive directional antennas associated with the plurality of other devices is switched among a set of transmit sectors or among a set of receive sectors, respectively, while either each of the plurality of receive directional antennas or the transmit directional antenna is fixed to a first receive sector or a first transmit sector, respectively, b) transmitting the sector training sequence via the transmit directional antenna, wherein either the transmit directional antenna or each of the plurality of receive directional antennas is switched among the set of transmit sectors or among the set of receive sectors, respectively, while either each of the plurality of receive directional antennas or the transmit directional antenna is fixed to a next receive sector or a next transmit sector, respectively, c) repeating b) for a number of times equal to a total number of the transmit sectors in the transmit directional antenna or a maximum of a total number of the receive sectors among all the receive directional antennas, and d) receiving a feedback message indicative of an optimum transmit sector from each of the plurality of other devices, wherein the optimum transmit sector is selected based at least in part on link quality indicator (LQI) measurements performed with respect to the sector training sequences of a)-c); performing a fine level training comprising: e) transmitting a beam training sequence via the transmit directional antenna, wherein either the transmit directional antenna or each of the plurality of receive directional antennas is switched among a set of transmit beam directions within the optimum transmit sector or among a set of receive beam directions within an optimum receive sector, respectively, while either each of the plurality of receive directional antennas or the transmit directional antenna is fixed to a first receive beam direction or a first transmit beam direction, respectively, f) transmitting the beam training sequence via the transmit directional antenna, wherein either the transmit directional antenna or each of the plurality of receive directional antennas is switched among the set of transmit beam directions or among the set of receive beam directions, respectively, while either each of the plurality of receive directional antennas or the transmit directional antenna is fixed to a next receive beam direction or a next transmit beam direction, respectively, g) repeating f) for a number of times equal to either the total number of transmit beam directions within the optimum transmit sector or the maximum of the total number of receive beam directions within optimum receive sectors among all the other devices, and h) receiving a feedback message indicative of an optimum transmit beam direction from each of the other devices, wherein the transmit beam direction is selected based at least in part on LQI measurements performed with respect to the transmitted beam training sequences of e)-g); and communicating data to at least one of the other devices via the transmit directional antenna tuned to the optimum transmit beam direction indicated by the feedback message received from the at least one device via at least one optimum receive beam direction.

In another embodiment, there is a method of performing a beam discovery between a device and a plurality of other devices in a wireless network, the method comprising transmitting sector training sequences to a plurality of other devices via a transmit directional antenna, the transmit directional antenna having a set of transmit sectors; receiving a plurality of feedback messages from the plurality of other devices, wherein the plurality of feedback messages are indicative of optimum transmit sectors that have been determined at the other devices based at least in part on the sector training sequences; transmitting beam training sequences to the plurality of other devices via the transmit directional antenna; receiving a plurality of feedback messages from the plurality of other devices, wherein the plurality of feedback messages are indicative of optimum transmit beam directions within the optimum transmit sectors, the optimum transmit beam directions having been determined at the other devices based at least in part on the beam training sequences; and communicating data to at least one of the plurality of other devices via the transmit directional antenna tuned to at least one optimum transmit beam direction determined by the at least one device.

In another embodiment, there is a device in a wireless network, the device comprising a transmit directional antenna having a set of transmit sectors; and a processor configured to perform a coarse level training comprising: a) transmission of a sector training sequence via a transmit directional antenna, wherein either the transmit directional antenna or each of a plurality of receive directional antennas associated with a plurality of other devices is switched among a set of transmit sectors or among a set of receive sectors, respectively, while either each of the plurality of receive directional antennas or the transmit directional antenna is fixed to a first receive sector or a first transmit sector, respectively, b) transmission of the sector training sequence via the transmit directional antenna, wherein either the transmit directional antenna or each of the plurality of receive directional antennas is switched among the set of transmit sectors or among the set of receive sectors, respectively, while either each of the plurality of receive directional antennas or the transmit directional antenna is fixed to a next receive sector or a next transmit sector, respectively, c) repetition of b) for a number of times equal to a total number of the transmit sectors in the transmit directional antenna or a maximum of a total number of the receive sectors among all the receive directional antennas, and d) reception of a feedback message indicative of an optimum transmit sector from each of the plurality of other devices, wherein the optimum transmit sector is selected based at least in part on link quality indicator (LQI) measurements performed with respect to the sector training sequences of a)-c); perform a fine level training comprising: e) transmission of a beam training sequence via the transmit directional antenna, wherein either the transmit directional antenna or each of the plurality of receive directional antennas is switched among a set of transmit beam directions within the optimum transmit sector or among a set of receive beam directions within an optimum receive sector, respectively, while either each of the plurality of receive directional antennas or the transmit directional antenna is fixed to a first receive beam direction or a first transmit beam direction, respectively, f) transmission of the beam training sequence via the transmit directional antenna, wherein either the transmit directional antenna or each of the plurality of receive directional antennas is switched among the set of transmit beam directions or among the set of receive beam directions, respectively, while either each of the plurality of receive directional antennas or the transmit directional antenna is fixed to a next receive beam direction or a next transmit beam direction, respectively, g) repetition of f) for a number of times equal to either the total number of transmit beam directions within the optimum transmit sector or the maximum of the total number of receive beam directions within optimum receive sectors among all the other devices, and h) reception of a feedback message indicative of an optimum transmit beam direction from each of the other devices, wherein the transmit beam direction is selected based at least in part on LQI measurements performed with respect to the transmitted beam training sequences of e)-g); and communicate data to at least one of the other devices via the transmit directional antenna tuned to the optimum transmit beam direction indicated by the feedback message received from the at least one device.

In another embodiment, there is a device in a wireless network, the device comprising a transmit directional antenna; and a processor configured to transmit sector training sequences to a plurality of other devices via the transmit directional antenna; receive a plurality of feedback messages from the plurality of other devices, wherein the plurality of feedback messages are indicative of optimum transmit sectors that have been determined at the other devices based at least in part on the sector training sequences; transmit beam training sequences to the plurality of other devices via the transmit direction antenna; receive a plurality of feedback messages from the plurality of other devices, wherein the plurality of feedback messages are indicative of optimum transmit beam directions within the optimum transmit sectors, the optimum transmit beam directions having been determined at the other devices based at least in part on the beam training sequences; and communicate data to at least one of the plurality of other devices via the transmit directional antenna tuned to at least one optimum transmit beam direction determined by the at least one device.

In another embodiment, there is a method of performing a beam discovery between a device and a plurality of other devices in a wireless network, the method comprising receiving sector training sequences configured for a sector level training of a plurality of other devices via a receive directional antenna associated with one of the plurality of other devices, wherein: a portion of the sector training sequences is received during a beacon period of a superframe, and a remaining portion of the sector training sequences is received during a contention free period (CFP) of the same superframe; transmitting a feedback message indicative of an optimum transmit sector during the CFP of the same superframe, the optimum transmit sector having been determined at the one of the plurality of other devices based at least in part on link quality indicator (LQI) measurements performed on the sector training sequences; receiving beam training sequences configured for a beam level training of the plurality of other devices during the CFP of the same superframe; transmitting a feedback message indicative of an optimum transmit beam direction within the optimum transmit sector during the CFP of the same superframe, the optimum transmit beam direction having been determined at the one of the plurality of other devices based at least in part on LQI measurements performed on the beam training sequences; and receiving data from the device via the receive directional antenna tuned to at least one optimum receive beam direction, the optimum receive beam direction having been determined at the one of the plurality of other devices based at least in part on LQI measurements performed on the beam training sequences.

In another embodiment, there is a device in a wireless network, the device comprising a receive directional antenna; and a processor configured to receive sector training sequences configured for a course level training of a plurality of devices, wherein a portion of the sector training sequences is received during a beacon period of a superframe, and a remaining portion of the sector training sequences is received during a contention free period (CFP) of the same superframe; transmit a feedback message indicative of an optimum transmit sector during the CFP of the same superframe, the optimum transmit sector having been determined based at least in part on link quality indicator (LQI) measurements performed on the sector training sequences; receive beam training sequences configured for a fine level training of the plurality of devices during the CFP of the same superframe; transmit a feedback message indicative of an optimum transmit beam direction within the optimum transmit sector during the CFP of the same superframe, the optimum transmit beam direction having been determined based at least in part on LQI measurements performed on the beam training sequences; and receive data transmission via the receive directional antenna tuned to at least one optimum receive beam direction, the optimum receive beam direction having been determined based at least in part on LQI measurements performed on the beam training sequences.

DETAILED DESCRIPTION OF CERTAIN INVENTIVE EMBODIMENTS

Certain embodiments provide a method and system for performing a beam discovery (e.g., antenna training) between devices in a personal wireless area network (WPAN). In some embodiments, the antenna training overhead of the WPAN can be reduced and the throughput of the WPAN improved by use of a two-level antenna training scheme protocol to be described below. In some of such embodiments, the WPAN utilizes an IEEE 802.15.3c standard.

The following detailed description is directed to certain sample embodiments of the invention. However, the invention can be embodied in a multitude of different ways as defined and covered by the claims. In this description, reference is made to the drawings wherein like parts are designated with like numerals throughout.

Figure 1:
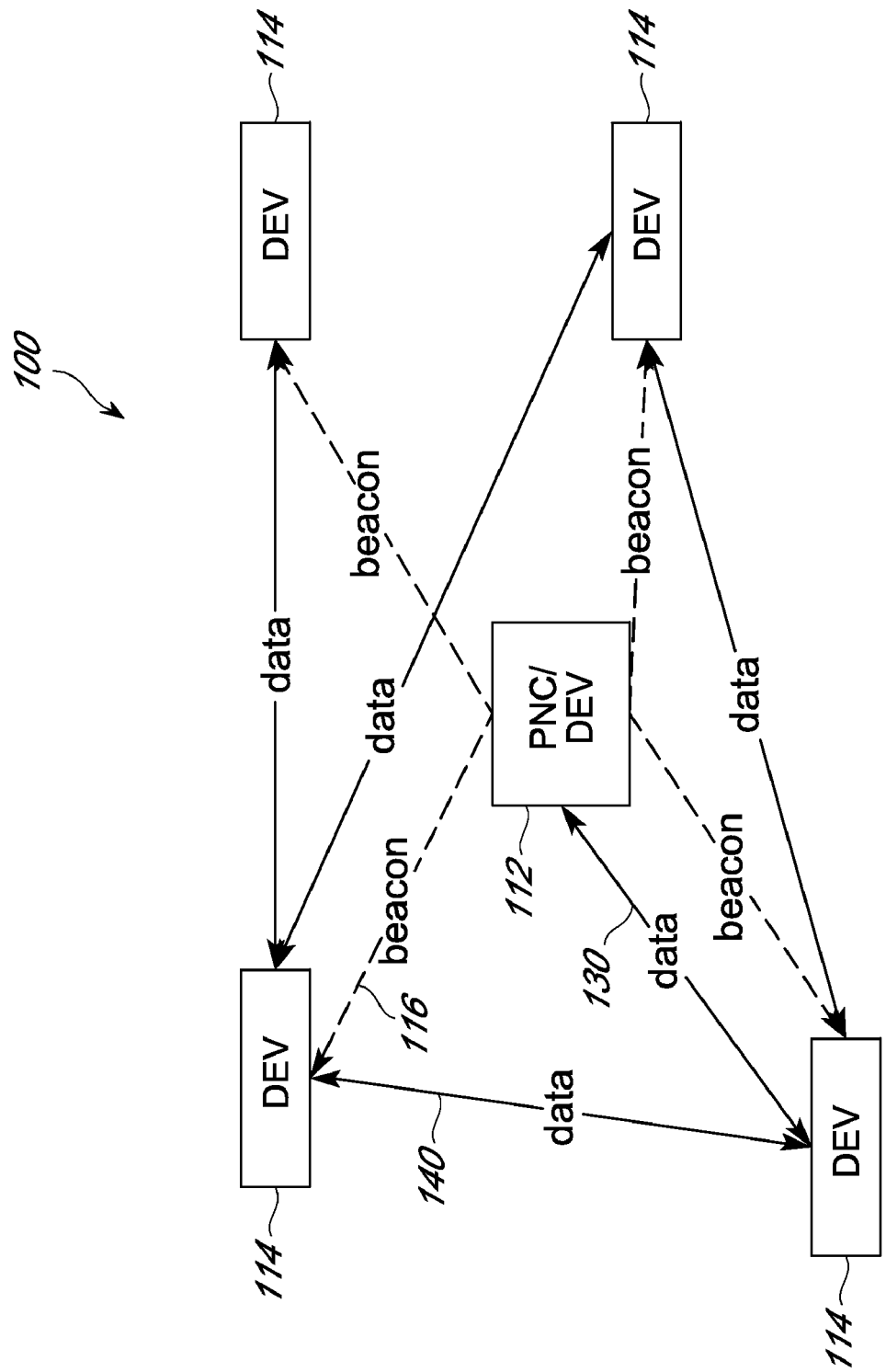
FIG. 1 is a functional block diagram of an exemplary configuration of a wireless network that implements data transmissions between wireless devices according to one embodiment of the system and method.

Exemplary implementations of embodiments in a wireless network will now be described. FIG. 1 shows a functional block diagram of a wireless network 100 that implements data transmission between devices such as a device coordinator and devices, according to certain embodiments. In other embodiments, one or more of the devices can be a computer, such as a personal computer (PC), and mobile devices such as a personal digital assistant (PDA), digital still or video cameras, and mobile phones. In some embodiments, the network is a Wireless Personal Area Network (WPAN). The network 100 includes a device coordinator 112 and multiple client devices or stations 114 (e.g., Device 1 . . . Device N). In embodiments where the wireless network is a WPAN, the device coordinator 112 can be a piconet controller (PNC). In the WPAN, the PNC enables communications between stations by reserving bandwidth or time periods for data transfers between the devices and/or between PNC and devices.

Certain embodiments of the wireless network utilize a superframe structure for data transport. In a superframe structure, beacons such as beacon 116 transmitted by the coordinator 112 act as limits or markers between transmissions in the sense that each transmission begins with a beacon and ends with a next beacon. Beacons provide synchronization as well as configuration information to the devices 114. Within superframes, contention can occur among devices, and such contentions are resolved by Carrier Sense Multiple Access with Collision Avoidance (CSMA/CA), followed by data transmissions 130, 140, for example. As shown in FIG. 1, data transmissions are of two types: 1) coordinator-to-device data streams such as transmission stream 130, and 2) peer-to-peer (P2P) data streams such as transmission stream 140.

Figure 2:
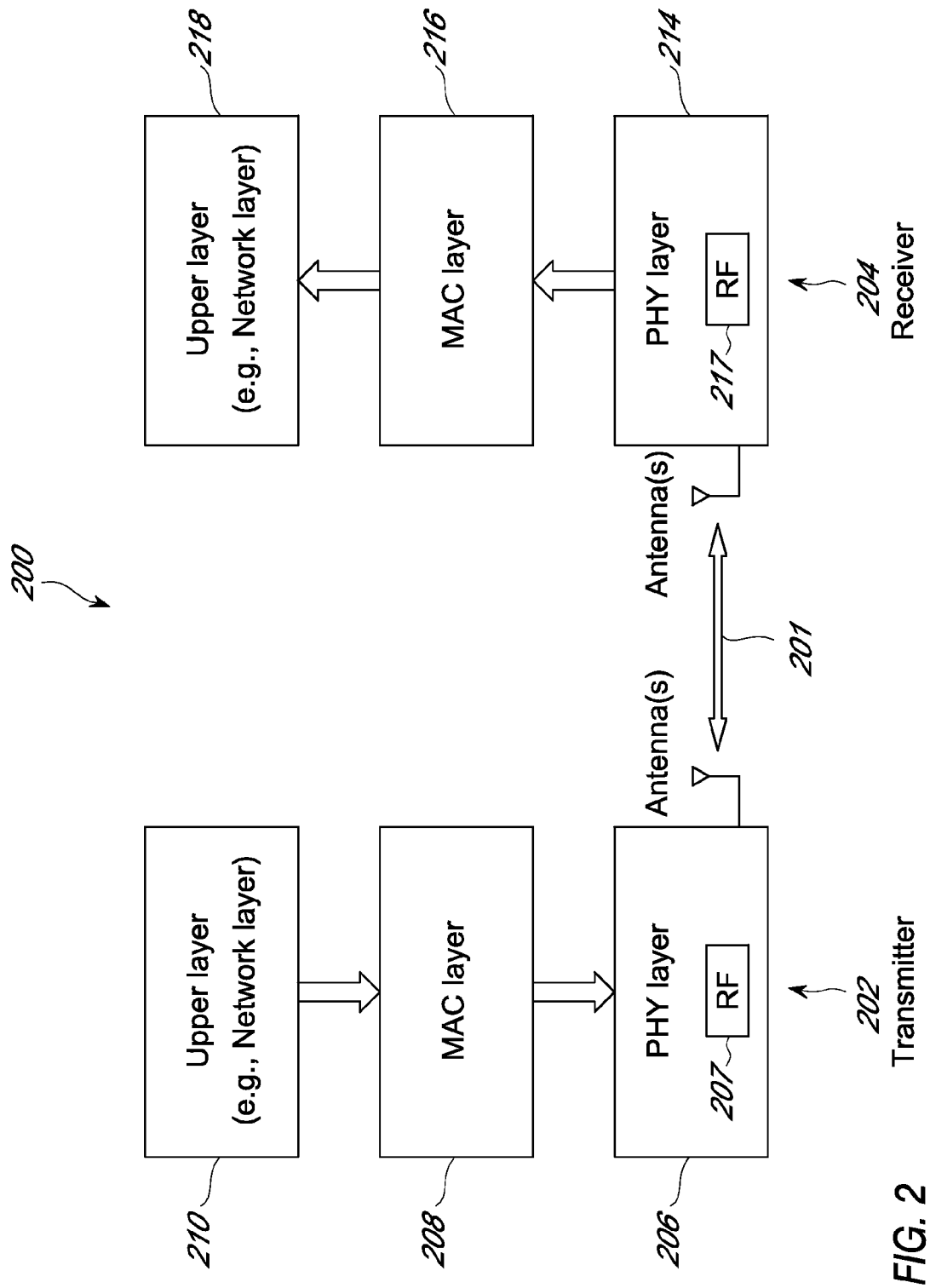
FIG. 2 is a functional block diagram of an example communication system for transmission of data, according to one embodiment of the system and method.

FIG. 2 shows a generalized block diagram illustrating an example wireless network system 200. The example wireless network system 200 includes a transmit device 202 and receive device 204. The transmit device 202 or the receive device 204 can be a device coordinator 112 or a device 114 shown in FIG. 1. In certain embodiments, the wireless network system 200 shown in FIG. 2 represents an IEEE 802.15 stack for a Wireless Personal Area Network (WPAN). In other embodiments, the wireless network 200 represents an IEEE 802.11 stack for Wireless Local Area Network (WLAN). The transmitter 202 includes a physical (PHY) layer 206, a media access control (MAC) layer 208, an upper layer 210, and one or more antennas associated with the PHY layer 206. Similarly, the receiver 204 includes a PHY layer 214, a MAC layer 216, an upper layer 218, and one or more antennas associated with the PHY layer 214. In some embodiments, the PHY layers 206, 214 include radio frequency (RF) modules 207, 217. The PHY layers 206, 214 provide wireless communication between the transmitter 202 and the receiver 204 via the RF modules 207, 217 and the one or more antennas through a wireless medium 201. The MAC layers 208, 216 provide addressing and channel access controls that make it possible for several network nodes to communicate within a multi-point network such as the wireless network 100 shown in FIG. 1.

The upper layers 210, 218 represent one or more layers that are above the MAC layers 208, 216, respectively, and send or receive command and/or data messages to or from the MAC layers, respectively. In certain embodiments (e.g., OSI or TCP/IP models), the upper layers 210, 218 include a network layer. In certain embodiments, the network layer includes an IP protocol that performs the basic task of getting data packets from source to destination. In other embodiments (e.g., five-layer TCP/IP model), the upper layers 210, 218 further include a transport layer and an application layer. In other embodiments, (e.g., a seven-layer OSI model), the upper layers 210, 218, in addition to the transport layer and the application layer, further include a session layer and a presentation layer.

In the transmit device 202, the upper layer 210 provides data (e.g., text, graphics, or audio data) and/or command messages to the MAC layer 208. In certain embodiments, the MAC layer 208 can include a packetization module (not shown) which puts the data and/or command messages into the form of one or more data packets. The MAC layer 208 then passes the data packets to the PHY layer 206. The PHY/MAC layers of the transmitter 202 add PHY and MAC headers to the data packets. The PHY layer 206 transmits wireless signals including the data packets to the receiver 204 via the RF module 207 over the wireless channel 201.

In the receive device 204, the PHY layer 214 receives the transmitted wireless signals including the data packets via the RF module 217. The PHY/MAC layers 214, 216 then process the received data packets to extract one or more data/command messages. The extracted data/command messages are passed to the upper layer 210 where the messages are further processed and/or transferred to other modules or devices to be displayed (text or graphics) or played (audio), for example.

The terms "transmit device" and "receive device" are used for illustrative purposes only and are not meant to limit the transmit device 202 and the receive device 204 shown in FIG. 2 as devices that can only transmit and receive data, respectively. It will be appreciated that the transmit device 202 can also receive wireless signals from the receive device 204 or another device 114 or a device coordinator 112 in the wireless network 100 (FIG. 1). Similarly, it will be appreciated that the receive device 204 can also transmit wireless signals to the transmit device 202 or another device 114 or a device coordinator 112. For example, assume that the transmit device 202 is a personal computer (PC) and the receive device 204 is a personal digital assistant (PDA). While the PDA can receive or download data from the PC at certain times, it can also transmit or upload data to the PC at other times. In this sense, the PC and the PDA can switch roles between transmit and receive devices.

In certain embodiments, the transmit device 202 and the receive device 204 can include directional antennas via which they transmit and receive wireless signals. The directional antennas can include antenna systems comprising multiple sectors or elements including a switched (sectored) antenna and a phased array antenna. The directional antenna can also include a single-element directional antenna. Before a pair of devices with directional antennas engages in data communication, the pair typically performs an antenna training or beamforming in order to improve a signal-to-noise ratio (SNR) or other measures of link quality indicators (LQIs).

Two-Level Antenna Training

In order to reduce the amount of time and overhead requirements for antenna training in 802.15.3c PHY such as for single carrier PHY, high speed interface (HSI) orthogonal frequency-division multiplexing (OFDM) PHY and audio video OFDM (AV-OFDM) PHY, a two-level training mechanism can be used during the beamforming procedures. The two-level training mechanism can be divided into a sector level (e.g., a coarse level) training and a beam level (e.g., a fine level) training, respectively. The sector level training can provide a sector antenna training in which a set of antenna sectors (e.g., specified by sector codewords) with antenna patterns that can cover a relatively broad area is used. On the other hand, the beam level training can provide fine antenna training in which a set of beam directions (e.g., specified by beam codewords) with antenna patterns that can cover a narrower angle is used.

Figure 3A:
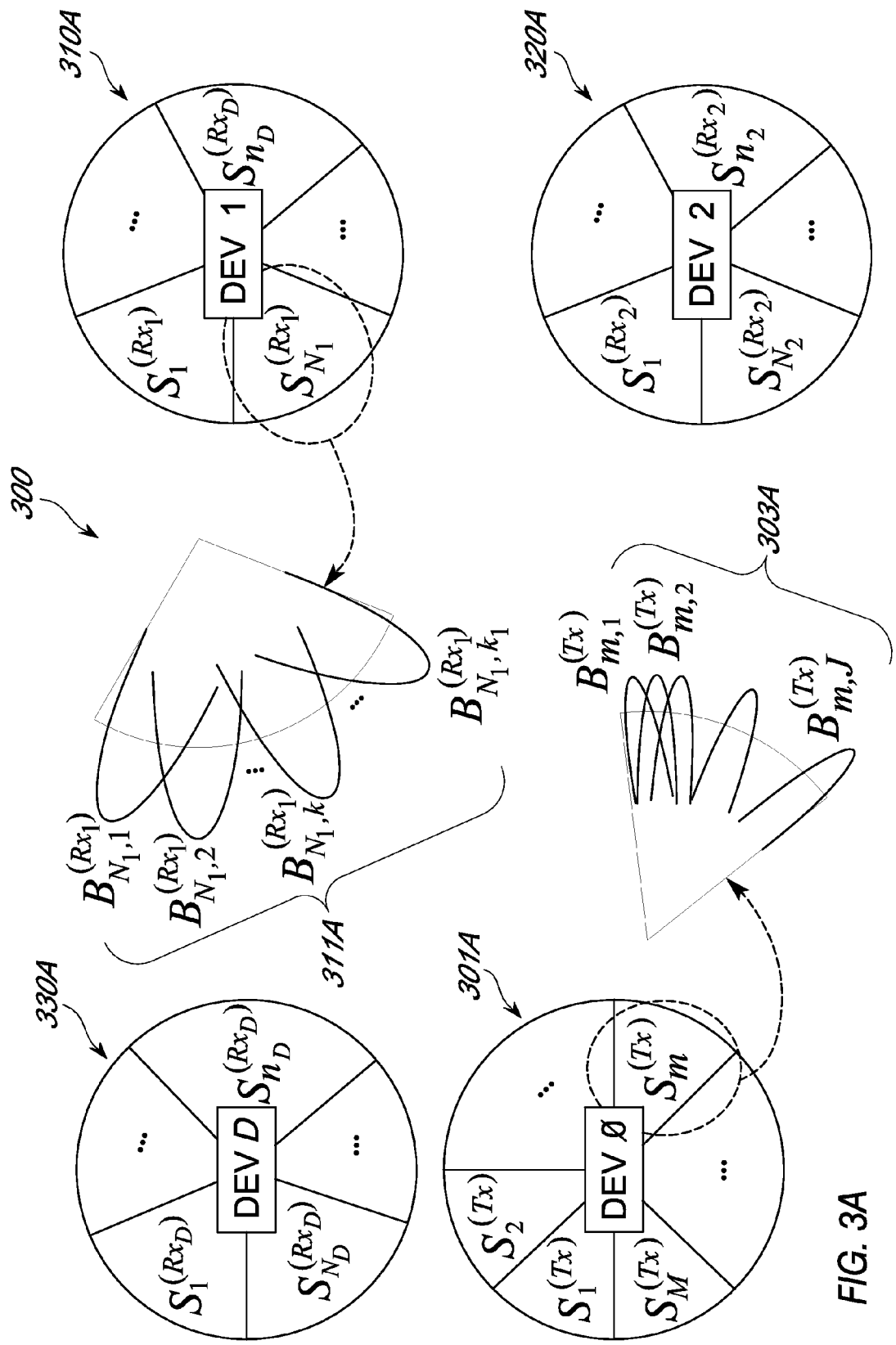
FIG. 3A is a diagram showing a schematic wireless network (e.g., a WPAN) having a device (e.g., a piconet controller (PNC)) and a plurality of other devices (DEVs) where the device and/or the plurality of other DEVs can be multiple-antenna systems that can include a plurality of sectors and each of the plurality of sectors can include a plurality of beams directions.

FIG. 3A shows a schematic wireless network 300A, e.g., a WPAN, having a device (DEV0) 301A and multiple other devices (DEVs)— DEV 1 310A, DEV 2 320A, . . . , DEV D 330A. DEV0 301A can be a device that is initiating the antenna training. In certain embodiments, DEV0 301A can be a coordinator (e.g., a PNC) for the WPAN. Each of the PNC 301A and/or the DEVs 310A, 320A, . . . 330A can include a plurality of sectors and each of the plurality of sectors can include a plurality of directional beams or beam directions. Depending on the capability of the PNC and DEVs, the number of sectors and the number of beam directions per sector are implementation dependent. In other embodiments, DEV0 301A can be a non-coordinator device which initiates the antenna training. In some of such embodiments, DEVs 310A, 320A, . . . , 330A can include a coordinator (e.g., a PNC) for the WPAN.

As a way of illustration, assume that that DEV 0301A is a PNC for the WPAN and that the PNC 301A includes M transmit sectors given by:

$$S^{(Tx)} = \{S_1^{(Tx)}, S_2^{(Tx)}, \ldots, S_m^{(Tx)}, \ldots, S_M^{(Tx)}\}$$

Also assume that each of the M transmit sectors, e.g., $S_m^{(Tx)}$, of the PNC 301A include J transmit beam directions (e.g., 303A) to give a total of M×J transmit beams. These transmit beam directions can be denoted by:

$$B^{(Tx)} = \{B_{1,1}^{(Tx)}, B_{1,2}^{(Tx)}, \ldots, B_{1,J}^{(Tx)}, \ldots, B_{M,J}^{(Tx)}\}$$

where $B_{m,j}^{(Tx)}$ corresponds to the j-th beam of the m-th sector in the PNC.

Assuming there are D DEVs present in the network and each of the D DEVs can have a different number of receive sectors, $N_d$ and a different number of receive beams or receive beam directions (e.g., 311A) per sector, $K_d$. The total number of receive sectors for all the DEVs is given by:

$$S^{(Rx)} = \{S_1^{(Rx_1)}, S_2^{(Rx_1)}, \ldots, S_{n_d}^{(Rx_1)}, \ldots, S_{N_1}^{(Rx_1)}, S_1^{(Rx_2)}, \ldots, S_{N_2}^{(Rx_2)}, S_1^{(Rx_d)}, \ldots, S_{N_D}^{(Rx_D)}\}$$

where $S_{n_d}^{(Rx_d)}$ denotes the $n_d$-th receive sector of the d-th DEV. The total set of receive beam directions for all the D DEVs is given by $$B^{(Rx_1)} = \left\{ \underbrace{B_{1,1}^{(Rx_1)}, B_{1,2}^{(Rx_1)}, \ldots, B_{1,K_1}^{(Rx_1)}, \ldots, B_{n_1,K_1}^{(Rx_1)}, \ldots, B_{N_1,K_1}^{(Rx_1)}}_{DEV1}, \underbrace{B_{1,1}^{(Rx_2)}, B_{1,2}^{(Rx_2)}, \ldots, B_{1,K_2}^{(Rx_2)}, \ldots, B_{N_2,K_2}^{(Rx_2)}}_{DEV2}, \ldots, \underbrace{B_{N_d,k_d}^{(Rx_d)}}_{DEVd} \ldots \underbrace{B_{N_D,K_D}^{(Rx_D)}}_{DEVD} \right\}$$

where $B_{n_d,k_d}^{(Rx_d)}$ corresponds to the $k_d$-th beam direction of the $n_d$-th receive sector for the d-th DEV. As an example, receive beam directions 311A within the $N_1$-th receive sector ($S_{N_1}^{(Rx)}$) are shown in FIG. 3A.

Figure 3B:
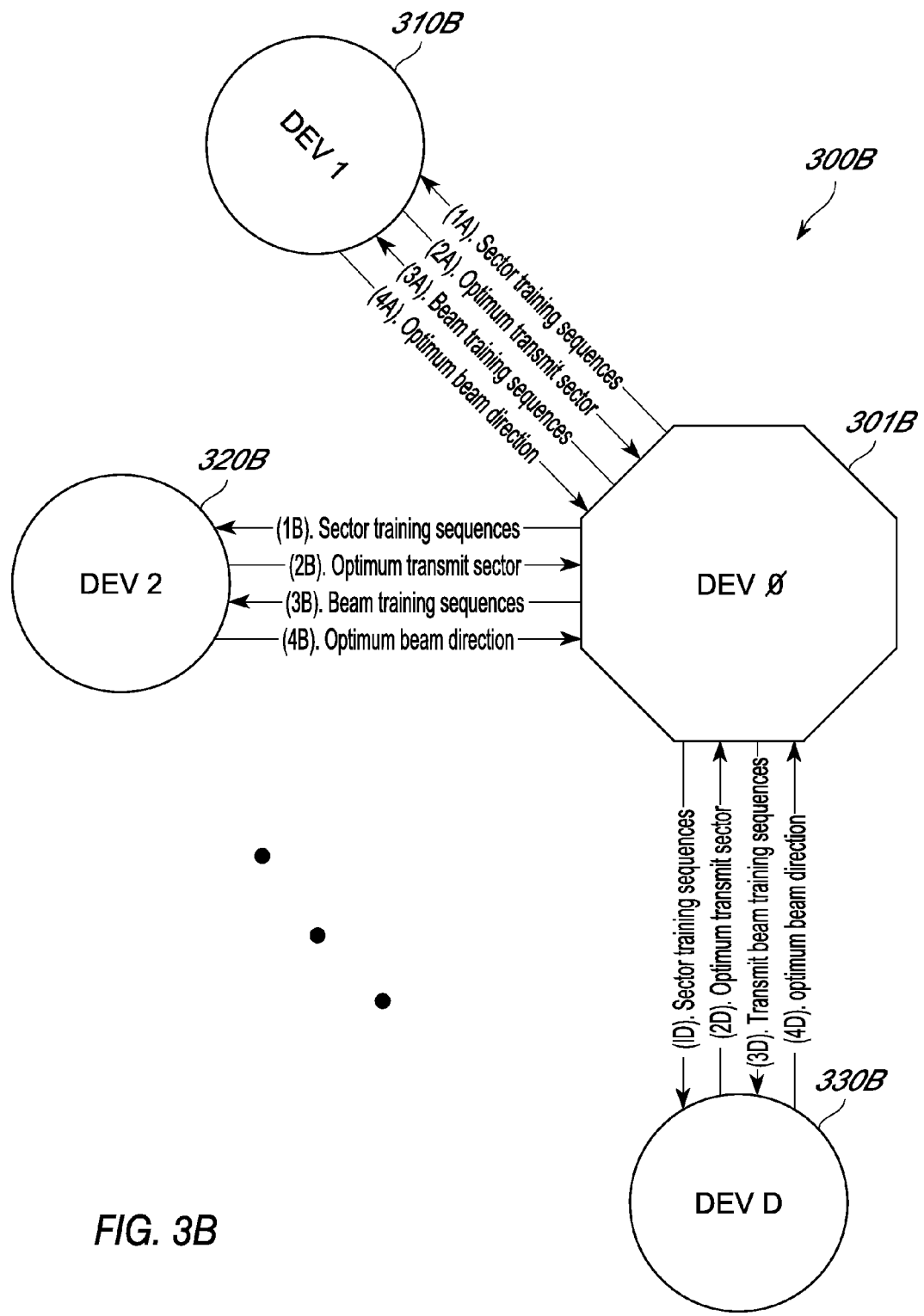
FIG. 3B is an example message sequence chart involving a device (e.g., PNC) and a plurality of other devices (DEVs) in a wireless network, for illustrating one embodiment of a two-level beamforming (BF) procedure.
Figure 4:
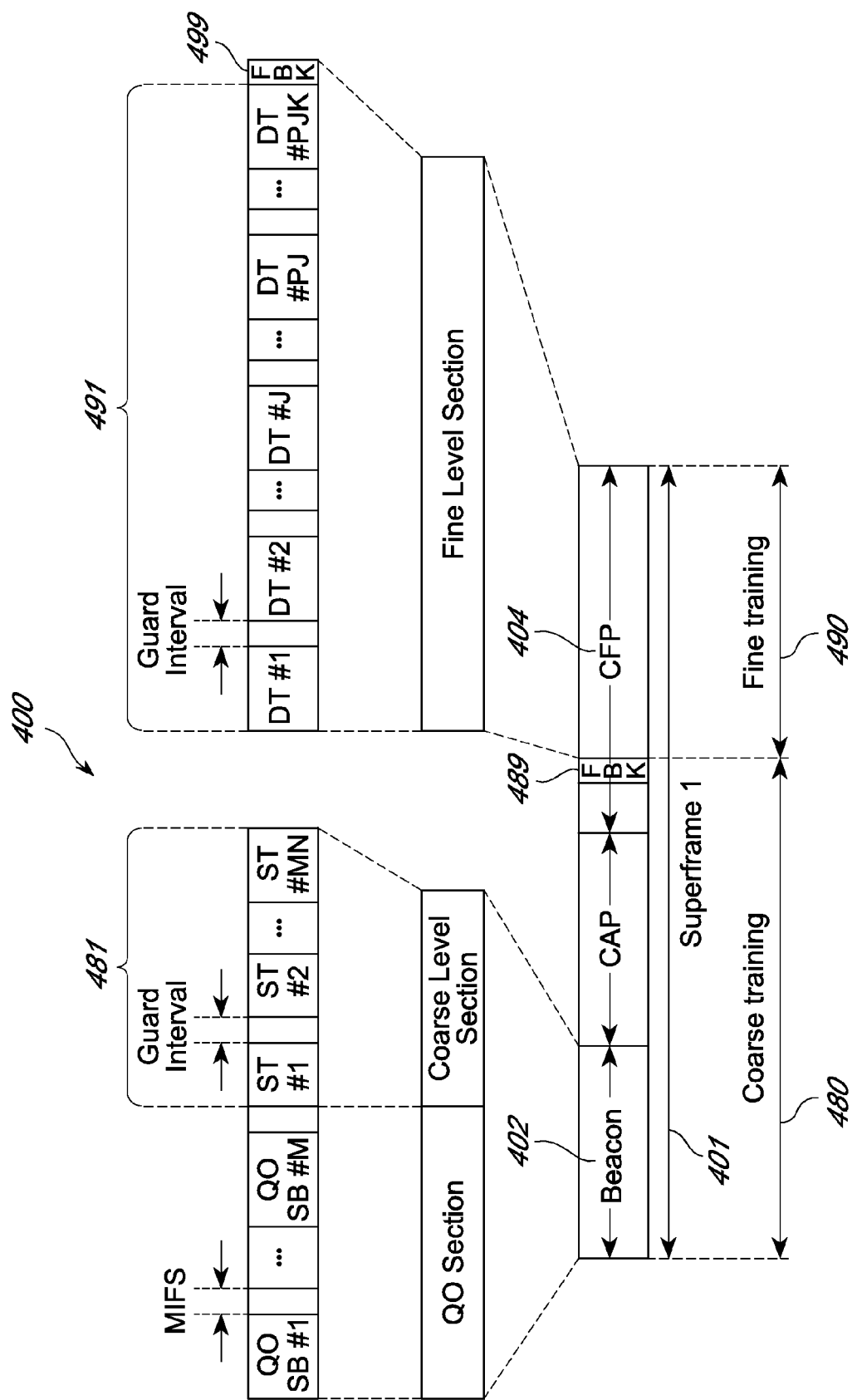
FIG. 4 is a diagram showing an example superframe structure that can be used in a two-level BF procedure, such as the one illustrated by FIG. 3B, in which the coarse level training and the fine level training both take place in the same superframe.

FIG. 3B is an example message sequence chart 300B involving a device (DEV0) 301B (e.g., a piconet controller (PNC)) and a plurality of other devices (DEVs), e.g., DEV 1 310B, DEV 2 320B, . . . , DEV D 330B, for illustrating one embodiment of a two-level beamforming (BF) procedure. FIG. 4 shows an example superframe structure 400 that can be used in a two-level BF procedure, such as the one illustrated by FIG. 3B, in which the coarse level training and the fine level training both take place in the same superframe. The two-level BF procedure is divided into two training sections: a coarse (sector) level training 480 and a fine (beam) level training 490. In the description that follows, the two-level BF procedure is described with respect to FIGS. 3B and 4 from the perspective of DEV0 (e.g., PNC) 301B. Subsequently, other possible superframe structures that can support a two-level BF procedure will be described with respect to FIGS. 5-7.

I. Sector (Coarse) Level Training

In the sector level training, DEV0 (e.g., a PNC) 301B transmits sector training sequences to all the other devices (e.g., DEV 1, DEV 2, . . . , DEV D) as indicated by the arrows 1(A)-1(D) (FIG. 3B). In the particular embodiment illustrated by FIG. 4, the transmission of the sector training sequences 1(A)-1(D) take place during a coarse level training section 481 of the beacon period 402 of a superframe 401. The sector training sequences 1(A)-1(D) include M×N identical training sequences over M different directions (or antenna patterns) as specified by the M sector codewords during the beacon period 402. The scalar N is the maximum number of sectors among all DEVs given by:

$$N = \max\{N_d\} \text{ for } d=1,2,\ldots D \qquad (1)$$

DEVs (e.g., DEV-1, DEV-2, . . . DEV-D 310B, 320B, . . . , 330B) that are in a reception range can listen to or receive the sector training sequences 1(A)-1(D) by switching to receive sector one (denoted as $n_d=1$) of the total $N_d$ receive sectors, with directions specified by the first sector codewords of the d-th DEV during the current superframe 401 as shown in FIG. 4. After the reception, each of the DEVs computes or estimates link quality indicator (LQI) measurements, $P_{m,n_d}$ for $m=1, 2, \ldots, M$ between $\{m, n_d=1\}$ sector pairs at the PNC and each DEV, respectively. The exact definition of LQI is implementation dependent. Various forms of link quality indicator are known in the art and can be used. For example, certain embodiments can use signal-to-noise ratios (SNRs) associated with the received training sequences. Some of the SNR embodiments can use a maximum-likelihood (ML) SNR estimator technique. Other embodiments can use received signal strength indicators (RSSIs). Yet other embodiments can use signal to noise and interference ratios (SNIRs). The maximum LQI between all the M sectors of the PNC and the first sector of the d-th DEV is given by:

$$LQI_{n_d=1} = \max \{P_{m,n_d=1}\} \text{ for } m=1, 2, \ldots, M \qquad (2)$$

This maximum LQI is stored and used as a measure to indicate the best channel link quality (e.g. received power or SNR level) between the optimum transmit sector at the PNC and the $n_d=1$ receive sector at each DEV.

In the next cycle (e.g., after transmission of the M identical training sequences over M directions), the DEVs 310B, 320B, . . . 330B in range again listen by switching to a new receive sector, $n_d=2$ (which differs from the receive sector used in the previous cycle). Similarly, the maximum LQI between all the M transmit sectors of DEV0 (e.g., PNC) 301B and the second receive sector of the d-th DEV, $LQI_{n_d=2}$ is computed and stored. This process is repeated over N cycles until all the N receive sectors of the DEVs have been covered to provide N LQI measurements for each DEV. The DEVs can then determine the optimum sector pairs (e.g., an optimum transmit sector and a set of optimum receive sectors) between DEV0 and the other DEVs by selecting the best LQI measured over the N cycles. At the end of the coarse level training procedure described above, each of the DEVs sends a feedback and DEV0 (e.g., PNC) 301B receives the determined optimum sector(s) of DEV0 and the capability of the DEV (such as number of beams per sector $K_d$) to DEV0 as indicated by arrows 2(A)-2(D) (FIG. 3B) during a first feedback period 489 of a contention free period (CFP) 404 (e.g., channel time allocation period (CTAP) of the IEEE 802.15.3c standard) of the current superframe 401 (FIG. 4). In some embodiments, the DEVs send the feedback messages to DEV0 (e.g., PNC) via optimum transmitter sectors of the DEVs, which, for symmetric antenna systems, correspond to the optimum receive sectors previously obtained. While the DEVs are sending the feedback messages to DEV0, the receive sector of DEV0 (which also corresponds to the transmit sector assuming DEV0 is a symmetric antenna system) can be rotating since the DEV0 still does not know its optimum receive sector.

II. Beam (Fine) Level Training

The feedback information received by DEV0 301B from the DEVs 310B, 320B, . . . 330B, after the transmissions of the sector training sequences 1(A)-1(D), can be used for fine level antenna training in the CFP 404 of the current superframe 401 (FIG. 4). By knowing the optimum sector pairs prior to the fine level antenna training, the DEV0 301B and each of the DEVs 310B, 320B, 330B can select a subset of directional beams that are within the optimum transmit sectors and optimum receive sectors, respectively. Let $P \leq M$ be the number of optimum transmit sectors at DEV0 (e.g., PNC) 301B corresponding to all D DEVs, and let K be the maximum number of receive beams per sector for all DEVs given by:

$$K = \max\{K_d\}; \text{ for } d=1,2,\ldots,D \qquad (3)$$

In a fine level training sequences section 491, depending on the number of beams per sector and the number of cycles per superframe, DEV0 301B may transmit beam training sequences (1A-1D) comprising P×J×K repetitions of a training sequence over the P×J transmit beam directions specified by the beam codewords within one superframe. In this case, DEV0 utilizes the optimum transmit sectors it received via the coarse level training by first transmitting J repetitions of a training sequence in a set of J transmit directions specified by a set of J beam codewords that cover the first optimum sector of DEV0 301B. DEV0 301B repeats the transmission of the J repetitions of a training sequence in the second set of J directions specified by the second set of J beam codewords that cover the second optimum sector of DEV0. This process is repeated until all P optimum sectors of DEV0 301B are covered.

Similarly, the DEVs 310B, 320B, 330B also utilize the optimum receive sectors in receiving the training sequence by switching to one of the K directions (which are within the optimum sector of the respective DEVs) specified by the K beam codewords. During the k-th beam, the DEVs compute the LQI between the j-th transmit beam direction of the p-th optimum transmit sector of DEV0 and k-th receive beam direction of the other DEVs. This process is repeated until all the LQIs for the P×J×K combinations are computed by the DEVs. Note that for DEVs with $K_d < K$, the DEVs can reuse any of the $K_d$ beams in receiving the training sequence or be idle once all of its $K_d$ beam directions have been tested and their associated $K_d$ LQIs have been computed.

The DEVs select the optimum directional beam pairs between DEV0 and the corresponding DEVs by choosing the best LQI measurements. At the end of the fine level training procedures described above, each of the DEVs can send a feedback message indicative of the corresponding optimal transmit beamforming vector to DEV0 during a second feedback period 499 of the CFP 404 of the current superframe 401. In certain embodiments, training sequences used in the directional transmission can allow channel state information (CSI) acquisition and channel tracking to be performed. In the case when the size of the P×J×K is too large, the PNC may transmit P×J repetitions of a training sequence over the P×J directions specified by the beam codewords over K superframes.

The above description focused on those embodiments in which the transmit directional antenna of DEV0 (e.g., PNC) is rotating or switched among a set of transmit sectors/beam directions while the receive directional antenna of each of the devices is fixed to a particular receive sector/beam direction during each transmission of the sector/beam training sequences. However, it shall be appreciated by those skilled in the art in view of the description herein that in certain other embodiments, the transmit directional antenna can be fixed to a particular transmit direction while each of the receive directional antennas can be switched among a set of receive sectors during transmission of each of the sector training sequences, and that the transmit directional antenna can be fixed to a particular transmit beam direction while each of the receive directional antennas can be switched among a set of receive beam directions during transmission of each of the beam training sequences. Similarly, it shall be appreciated by those skilled in the art in view of the description herein that in yet other embodiments, other permutations are also possible. As an example, the transmit directional antenna can be switched among a set of transmit sectors during transmission of each sector training sequence in the coarse training level but can be fixed to a particular transmit beam direction during each of the beam training sequences in the fine level training. Similarly, in another example, the transmit directional antenna can be fixed to a particular transmit sector during transmission of each sector training sequence in the coarse training level but can be switched among a set of transmit beam directions during each of the beam training sequences in the fine training level.

III. Alternative Superframe Structures

While the superframe structure of FIG. 4 and its associated description focused on one embodiment of the two-level BF procedure in which transmissions of the coarse (sector) level training sequences take place during a beacon period of a superframe and transmissions of the fine (beam) level training sequences take place during a CFP period of the same superframe, various other alternative superframe structures that can support the two-level BF procedure are possible.

Figure 5:
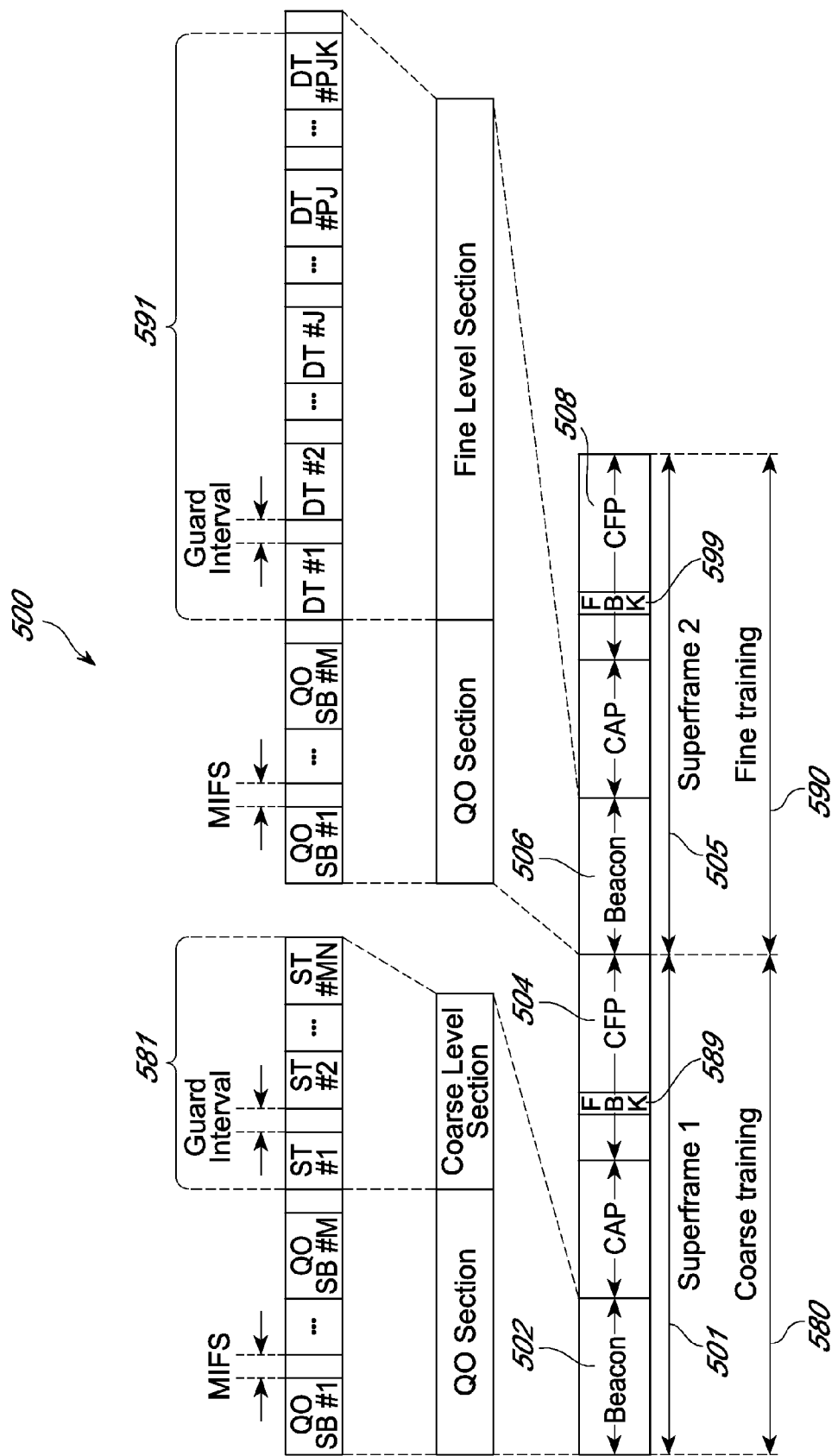
FIG. 5 is a diagram showing an alternative superframe structure that can be used in a two-level BF procedure, in which the coarse level training takes place in a first superframe, and the fine level training takes place in a second (e.g., next) superframe.

For example, FIG. 5 shows an alternative superframe structure 500 that can be used in a two-level BF procedure, in which a coarse level training 580 takes place in a first superframe 501, and a fine level training 590 takes place in a second (e.g., next) superframe 502. In those embodiments that employ superframe structures that are identical or similar to the superframe structure 500, coarse level training sequences 581 (e.g., 1A-1D of FIG. 3B) are transmitted during a beacon period 502 of the first superframe 501. The transmissions and receptions of a first set of feedback messages (e.g., 2A-2D of FIG. 3B) indicative of optimum transmit sectors (e.g., optimum sector codebook vectors) take place during a feedback period 589 in a CFP period 504 of the first superframe 501. Fine level training sequences 591 (e.g., 3A-3D of FIG. 3B) are transmitted during a beacon period 506 of the second superframe 505. The transmissions and receptions of a second set of feedback messages (e.g., 4A-4D of FIG. 3B) indicative of optimum transmit beam directions (e.g., optimum beam codebook vectors) take place during a feedback period 599 in a CFP period 508 of the second superframe 505.

Figure 6:
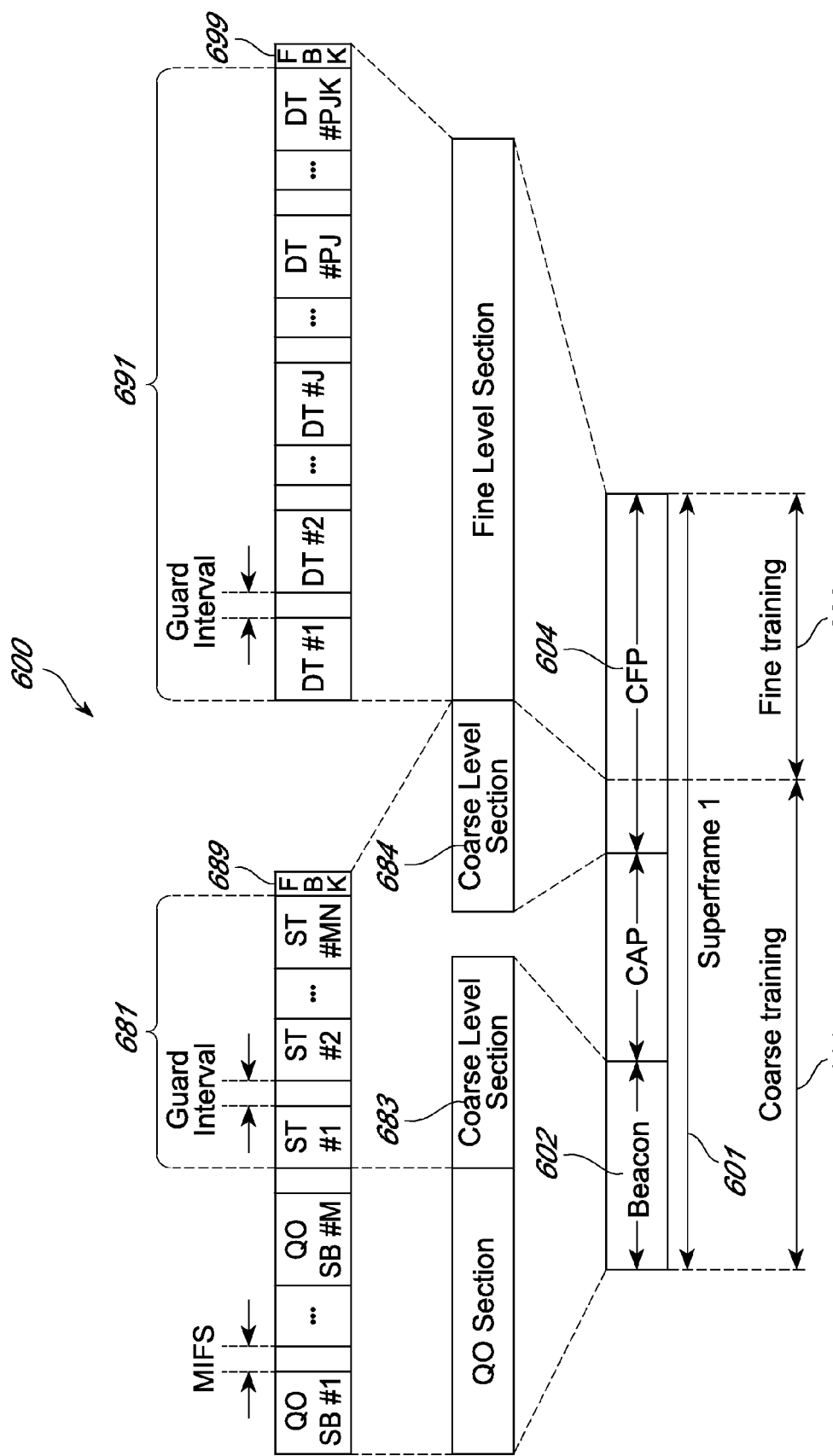
FIG. 6 is a diagram showing yet another alternative superframe structure that can be used in a two-level BF procedure, in which the coarse level training takes place in a beacon period as well as a portion of a contention free period (CFP) of a superframe, and the fine level training takes place in the CFP period of the same superframe.

FIG. 6 shows yet another alternative superframe structure 600 that can be used in a two-level BF procedure, in which a coarse level training 680 takes place in a beacon period 602 as well as a portion of a CFP period 604 of a superframe 601, and a fine level training 690 training takes place in the CFP period 604 of the same superframe 601. In those embodiments that employ superframe structures that are identical or similar to the superframe structure 600, coarse level training sequences 681 (e.g., 1A-1D of FIG. 3B) are transmitted in a section 683 during a beacon period 602 of the first superframe 601 and also during a portion (e.g., a beginning section 684) of the CFP period 604. The transmissions and receptions of a first set of feedback messages (e.g., 2A-2D of FIG. 3B) indicative of optimum transmit sectors (e.g., optimum sector codebook vectors) take place during a feedback period 689 in the CFP period 604 of the same superframe 601. Fine level training sequences 691 (e.g., 3A-3D of FIG. 3B) are transmitted during the CFP period 604 of the same superframe 601. The transmissions and receptions of a second set of feedback messages (e.g., 4A-4D of FIG. 3B) indicative of optimum transmit beam directions (e.g., optimum beam codebook vectors) take place during a feedback period 699 in the CFP period 604 of the same superframe 601.

In some embodiments, the coarse level training 680 is immediately followed by the fine level training 690 in the CFP period 604 as shown in FIG. 6. In other embodiments, there may be other transmissions or tasks unrelated to the two-level BF procedure that can take place between the coarse level training and the fine level training.

Figure 7:
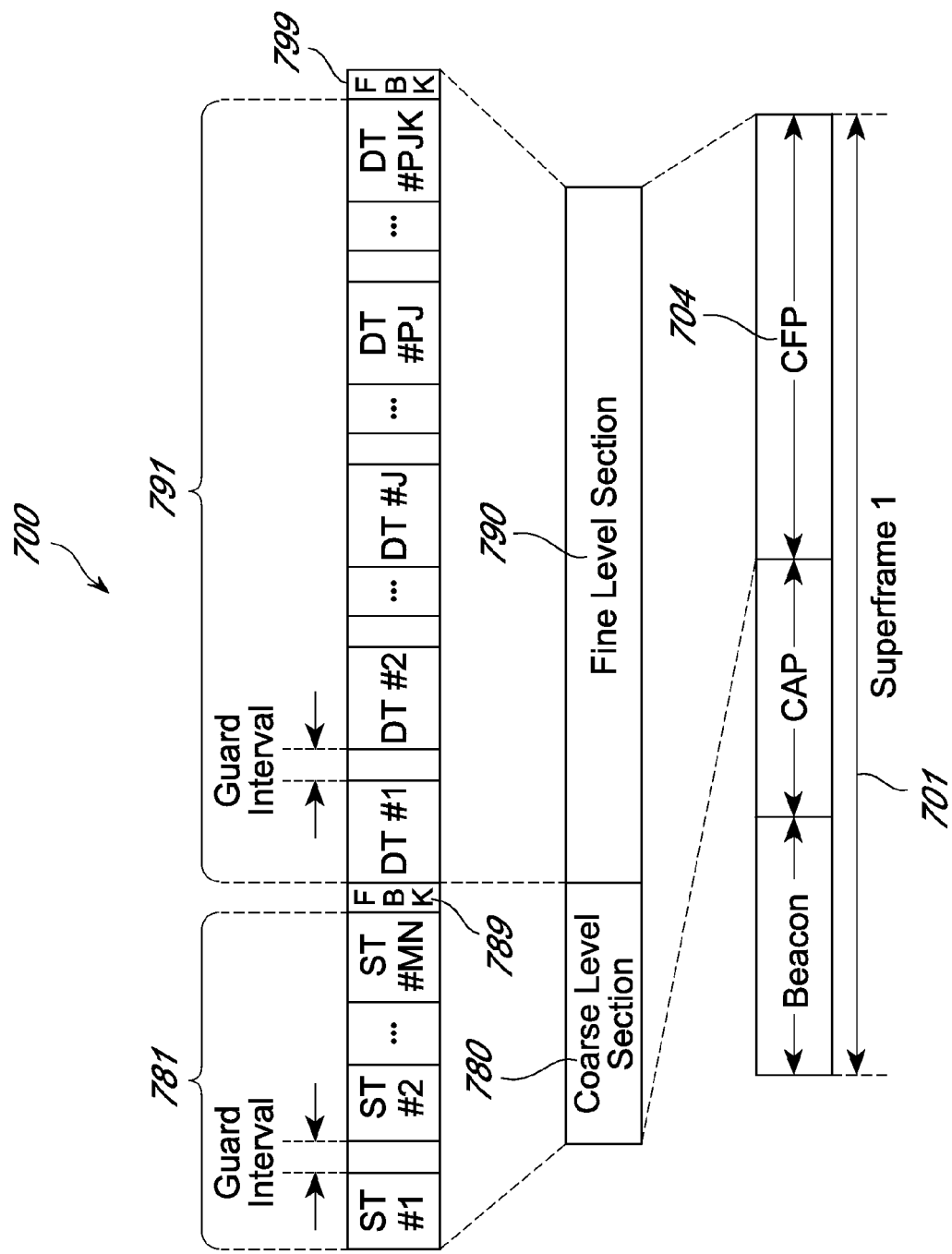
FIG. 7 is a diagram showing yet another alternative superframe structure that can be used in a two-level BF procedure, in which both the coarse level training and the fine level training take place in a CFP period of a superframe.

FIG. 7 shows yet another alternative superframe structure 700 that can be used in a two-level BF procedure, in which both a coarse level training 780 and a fine level training 790 take place in a CFP period 704 of a superframe 701. In those embodiments that employ superframe structures that are identical or similar to the superframe structure 700, the coarse level training sequences 781 (e.g., 1A-1D of FIG. 3B) are transmitted during the CFP period 704 of the superframe 701. Such embodiments, which are examples of "on-demand" antenna training methods as opposed to "proactive" antenna training methods exemplified by at least FIGS. 4, 5, and 6, can be used when the initiating device (e.g., DEV0 301A and DEV0 301B as shown in FIGS. 3A and 3B, respectively) is a non-coordinator device. The transmissions and receptions of a first set of feedback messages (e.g., 2A-2D of FIG. 3B) indicative of optimum transmit sectors (e.g., optimum sector codebook vectors) take place during a feedback period 789 in the CFP period 704 of the same superframe 701. The fine level training sequences 791 (e.g., 3A-3D of FIG. 3B) are transmitted during the CFP period 704 of the same superframe 701. The transmissions and receptions of a second set of feedback messages (e.g., 4A-4D of FIG. 3B) indicative of optimum transmit beam directions (e.g., optimum beam codebook vectors) take place during a feedback period 799 of the CFP period 704 of the same superframe 701.

In some embodiments, the coarse level training 780 is immediately followed by the fine level training 790 in the CFP period 604 as shown in FIG. 7. In other embodiments, there may be other transmissions or tasks unrelated to the two-level BF procedure that can take place between the coarse level training and the fine level training.

Conclusion

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of performing a beam discovery between a device and a plurality of other devices in a wireless network, the method comprising:

performing a coarse level training comprising:

a) transmitting a sector training sequence via a transmit directional antenna, wherein either the transmit directional antenna or each of a plurality of receive directional antennas associated with the plurality of other devices is switched among a set of transmit sectors or among a set of receive sectors, respectively, while either each of the plurality of receive directional antennas or the transmit directional antenna is fixed to a first receive sector or a first transmit sector, respectively, b) transmitting the sector training sequence via the transmit directional antenna, wherein either the transmit directional antenna or each of the plurality of receive directional antennas is switched among the set of transmit sectors or among the set of receive sectors, respectively, while either each of the plurality of receive directional antennas or the transmit directional antenna is fixed to a next receive sector or a next transmit sector, respectively, c) repeating b) for a number of times equal to a total number of the transmit sectors in the transmit directional antenna or a maximum of a total number of the receive sectors among all the receive directional antennas, and d) receiving a feedback message indicative of an optimum transmit sector from each of the plurality of other devices, wherein the optimum transmit sector is selected based at least in part on link quality indicator (LQI) measurements performed with respect to the sector training sequences of a)-c);

performing a fine level training comprising:

e) transmitting a beam training sequence via the transmit directional antenna, wherein either the transmit directional antenna or each of the plurality of receive directional antennas is switched among a set of transmit beam directions within the optimum transmit sector or among a set of receive beam directions within an optimum receive sector, respectively, while either each of the plurality of receive directional antennas or the transmit directional antenna is fixed to a first receive beam direction or a first transmit beam direction, respectively, f) transmitting the beam training sequence via the transmit directional antenna, wherein either the transmit directional antenna or each of the plurality of receive directional antennas is switched among the set of transmit beam directions or among the set of receive beam directions, respectively, while either each of the plurality of receive directional antennas or the transmit directional antenna is fixed to a next receive beam direction or a next transmit beam direction, respectively, g) repeating f) for a number of times equal to either the total number of transmit beam directions within the optimum transmit sector or the maximum of the total number of receive beam directions within optimum receive sectors among all the other devices, and h) receiving a feedback message indicative of an optimum transmit beam direction from each of the other devices, wherein the transmit beam direction is selected based at least in part on LQI measurements performed with respect to the transmitted beam training sequences of e)-g); and communicating data to at least one of the other devices via the transmit directional antenna tuned to the optimum transmit beam direction indicated by the feedback message received from the at least one device via at least one optimum receive beam direction.

2. The method of claim 1, wherein the wireless network is a wireless personal area network (WPAN).

3. The method of claim 2, wherein the WPAN utilizes an IEEE 802.15.3c standard.

4. The method of claim 2, wherein the device is a coordinator.

5. The method of claim 4, wherein the coordinator is a piconet controller (PNC).

6. The method of claim 1, wherein during transmission of each of the sector training sequences, the transmit directional antenna is switched among the set of transmit sectors while each of the plurality of receive directional antennas is fixed to a particular receive sector among the set of receive sectors.

7. The method of claim 6, wherein b) is repeated until all receive sectors of the plurality of receive directional antennas have been covered.

8. The method of claim 1, wherein during transmission of each of the sector training sequences, the transmit directional antenna is fixed to a particular transmit sector among the set of transmit sectors while each of the plurality of receive directional antennas is switched between sectors among the set of receive sectors.

9. The method of claim 8, wherein b) is repeated until all transmit sectors of the transmit directional antenna have been covered.

10. The method of claim 1, wherein during transmission of each of the beam training sequences, the transmit directional antenna is switched among the set of transmit beam directions within the optimum transmit antenna sector while at least one of the plurality of receive directional antennas is fixed to a particular receive beam direction among a set of receive beam directions within an optimum receive sector, the optimum receive sector having been selected based at least in part on the sector training.

11. The method of claim 10, wherein f) is repeated until all receive beam directions within the optimum receive sectors of the receive directional antennas associated with the plurality of other devices have been covered.

12. The method of claim 1, wherein during transmission of each of the beam training sequences, the transmit directional antenna is fixed to a particular transmit beam direction within the optimum transmit sector while each of a plurality of receive directional antennas associated with the other devices is switched between beam directions among a set of receive beam directions within an optimum receive sector, the optimum receive sector having been selected based at least in part on the sector training.

13. The method of claim 12, wherein f) is repeated until all transmit beam directions within the optimum transmit antenna sector of the transmit directional antenna have been covered.

14. The method of claim 1, wherein the LQI measurements include signal-to-noise (SNR) measurements.

15. The method of claim 1, wherein the transmissions of the sector training sequences of a)-c) are performed during a beacon period of a superframe, and the transmissions of the beam training sequences of e)-g) are performed during a contention free period (CFP) of the same superframe.

16. The method of claim 15, wherein the wireless network is a wireless personal area network (WPAN) utilizing an IEEE 802.15.3c standard, and wherein the contention free period (CFP) comprises a channel time allocation period (CTAP).

17. The method of claim 15, wherein the feedback message indicative of the optimum transmit sector is received during a contention free period (CFP) of the same superframe.

18. The method of claim 15, wherein the feedback message indicative of the optimum beam direction is received during a contention free period (CFP) of the same superframe.

19. The method of claim 1, wherein the transmissions of the sector training sequences of a)-c) are performed during a beacon period of a first superframe, and the transmissions of the beam training sequences of e)-g) are performed during a beacon period of a second superframe.

20. The method of claim 19, wherein the first superframe and the second superframe are consecutive superframes.

21. The method of claim 19, wherein the feedback message indicative of the optimum transmit sector is received during a contention free period (CFP) of the first superframe.

22. The method of claim 21, wherein the wireless network is a wireless personal area network (WPAN) utilizing an IEEE 802.15.3c standard, and wherein the contention free period (CFP) comprises a channel time allocation period (CTAP).

23. The method of claim 19, wherein the feedback message indicative of the optimum transmit beam direction is received during a contention free period (CFP) of the second superframe.

24. The method of claim 1, wherein the transmissions of the sector training sequences of a)-c) are performed during a beacon period of a superframe and also during a first portion of a contention free period (CFP) of the same superframe, and the transmissions of the beam training sequences of e)-g) are performed during a second portion of the CFP.

25. The method of claim 24, wherein the feedback message indicative of the optimum transmit sector is received during a contention free period (CFP) of the same superframe.

26. The method of claim 24, wherein the feedback message indicative of the optimum beam direction is received during a contention free period (CFP) of the same superframe.

27. The method of claim 1, wherein the transmissions of the sector training sequences of a)-c) are performed during a first portion of a contention free period (CFP) of a superframe, and the transmissions of the beam training sequences of e)-g) are performed during a second portion of the CFP of the same superframe.

28. The method of claim 27, wherein the feedback message indicative of the optimum transmit sector is received during a contention free period (CFP) of the same superframe.

29. The method of claim 27, wherein the feedback message indicative of the optimum beam direction is received during a contention free period (CFP) of the same superframe.

30. A method of performing a beam discovery between a device and a plurality of other devices in a wireless network, the method comprising:
transmitting sector training sequences to a plurality of other devices via a transmit directional antenna, the transmit directional antenna having a set of transmit sectors;
receiving a plurality of feedback messages from the plurality of other devices, wherein the plurality of feedback messages are indicative of optimum transmit sectors that have been determined at the other devices based at least in part on the sector training sequences;
transmitting beam training sequences to the plurality of other devices via the transmit directional antenna;
receiving a plurality of feedback messages from the plurality of other devices, wherein the plurality of feedback messages are indicative of optimum transmit beam directions within the optimum transmit sectors, the optimum transmit beam directions having been determined at the other devices based at least in part on the beam training sequences; and
communicating data to at least one of the plurality of other devices via the transmit directional antenna tuned to at least one optimum transmit beam direction determined by the at least one device.

31. The method of claim 30, wherein the wireless network is a wireless personal area network (WPAN).

32. The method of claim 31, wherein the device is a coordinator for the WPAN.

33. The method of claim 32, wherein the coordinator is a piconet controller (PNC).

34. The method of claim 31, wherein the device is a non-coordinator.

35. The method of claim 34, wherein the other devices includes a coordinator for the WPAN.

36. The method of claim 35, wherein the coordinator is a PNC.

37. The method of claim 30, wherein each of the sector training sequences include M×N identical training sequences, wherein M is a total number of sectors within the set of transmit sectors and N is a maximum number of sectors among all other devices.

38. A device in a wireless network, the device comprising:
a transmit directional antenna having a set of transmit sectors; and
a processor configured to:
perform a coarse level training comprising:
a) transmission of a sector training sequence via a transmit directional antenna, wherein either the transmit directional antenna or each of a plurality of receive directional antennas associated with a plurality of other devices is switched among a set of transmit sectors or among a set of receive sectors, respectively, while either each of the plurality of receive directional antennas or the transmit directional antenna is fixed to a first receive sector or a first transmit sector, respectively,
b) transmission of the sector training sequence via the transmit directional antenna, wherein either the transmit directional antenna or each of the plurality of receive directional antennas is switched among the set of transmit sectors or among the set of receive sectors, respectively, while either each of the plurality of receive directional antennas or the transmit directional antenna is fixed to a next receive sector or a next transmit sector, respectively,
c) repetition of b) for a number of times equal to a total number of the transmit sectors in the transmit directional antenna or a maximum of a total number of the receive sectors among all the receive directional antennas, and
d) reception of a feedback message indicative of an optimum transmit sector from each of the plurality of other devices, wherein the optimum transmit sector is selected based at least in part on link quality indicator (LQI) measurements performed with respect to the sector training sequences of a)-c);
perform a fine level training comprising:
e) transmission of a beam training sequence via the transmit directional antenna, wherein either the transmit directional antenna or each of the plurality of receive directional antennas is switched among a set of transmit beam directions within the optimum transmit sector or among a set of receive beam directions within an optimum receive sector, respectively, while either each of the plurality of receive directional antennas or the transmit directional antenna is fixed to a first receive beam direction or a first transmit beam direction, respectively,
f) transmission of the beam training sequence via the transmit directional antenna, wherein either the transmit directional antenna or each of the plurality of receive directional antennas is switched among the set of transmit beam directions or among the set of receive beam directions, respectively, while either each of the plurality of receive directional antennas or the transmit directional antenna is fixed to a next receive beam direction or a next transmit beam direction, respectively, g) repetition of f) for a number of times equal to either the total number of transmit beam directions within the optimum transmit sector or the maximum of the total number of receive beam directions within optimum receive sectors among all the other devices, and h) reception of a feedback message indicative of an optimum transmit beam direction from each of the other devices, wherein the transmit beam direction is selected based at least in part on LQI measurements performed with respect to the transmitted beam training sequences of e)-g); and communicate data to at least one of the other devices via the transmit directional antenna tuned to the optimum transmit beam direction indicated by the feedback message received from the at least one device.

39. The device of claim 38, wherein the wireless network is a wireless personal area network (WPAN) that utilizes an IEEE 802.15.3c standard.

40. The device of claim 39, wherein the device is a coordinator for the WPAN.

41. The device of claim 40, wherein the coordinator is a piconet controller (PNC).

42. A device in a wireless network, the device comprising:
a transmit directional antenna; and
a processor configured to:
  transmit sector training sequences to a plurality of other devices via the transmit directional antenna;
  receive a plurality of feedback messages from the plurality of other devices, wherein the plurality of feedback messages are indicative of optimum transmit sectors that have been determined at the other devices based at least in part on the sector training sequences;
  transmit beam training sequences to the plurality of other devices via the transmit direction antenna;
  receive a plurality of feedback messages from the plurality of other devices, wherein the plurality of feedback messages are indicative of optimum transmit beam directions within the optimum transmit sectors, the optimum transmit beam directions having been determined at the other devices based at least in part on the beam training sequences; and
  communicate data to at least one of the plurality of other devices via the transmit directional antenna tuned to at least one optimum transmit beam direction determined by the at least one device.

43. The device of claim 42, wherein the wireless network is a wireless personal area network (WPAN) that utilizes an IEEE 802.15.3c standard.

44. The device of claim 43, wherein the device is a coordinator for the WPAN.

45. The device of claim 44, wherein the coordinator is a piconet controller (PNC) for the WPAN.

46. The device of claim 43, wherein the device is a non-coordinator.

47. The device of claim 46, wherein the other devices include a PNC for the WPAN.

48. A method of performing a beam discovery between a device and a plurality of other devices in a wireless network, the method comprising:
  receiving sector training sequences configured for a sector level training of the plurality of other devices via a receive directional antenna associated with one of the plurality of other devices, wherein:
    a portion of the sector training sequences is received during a beacon period of a superframe, and
    a remaining portion of the sector training sequences is received during a contention free period (CFP) of the same superframe;
  transmitting a feedback message indicative of an optimum transmit sector during the CFP of the same superframe, the optimum transmit sector having been determined at the one of the plurality of other devices based at least in part on link quality indicator (LQI) measurements performed on the sector training sequences;
  receiving beam training sequences configured for a beam level training of the plurality of other devices during the CFP of the same superframe;
  transmitting a feedback message indicative of an optimum transmit beam direction within the optimum transmit sector during the CFP of the same superframe, the optimum transmit beam direction having been determined at the one of the plurality of other devices based at least in part on LQI measurements performed on the beam training sequences; and
  receiving data from the device via the receive directional antenna tuned to at least one optimum receive beam direction, the optimum receive beam direction having been determined at the one of the plurality of other devices based at least in part on LQI measurements performed on the beam training sequences.

49. The method of claim 48, wherein the wireless network is a wireless personal area network (WPAN) utilizing an IEEE 802.15.3c standard, and wherein the contention free period (CFP) comprises a channel time allocation period (CTAP).

50. A device in a wireless network, the device comprising:
a receive directional antenna; and
a processor configured to:
  receive sector training sequences configured for a course level training of a plurality of devices, wherein:
    a portion of the sector training sequences is received during a beacon period of a superframe, and
    a remaining portion of the sector training sequences is received during a contention free period (CFP) of the same superframe;
  transmit a feedback message indicative of an optimum transmit sector during the CFP of the same superframe, the optimum transmit sector having been determined based at least in part on link quality indicator (LQI) measurements performed on the sector training sequences;
  receive beam training sequences configured for a fine level training of the plurality of devices during the CFP of the same superframe;
  transmit a feedback message indicative of an optimum transmit beam direction within the optimum transmit sector during the CFP of the same superframe, the optimum transmit beam direction having been determined based at least in part on LQI measurements performed on the beam training sequences; and
  receive data transmission via the receive directional antenna tuned to at least one optimum receive beam direction, the optimum receive beam direction having been determined based at least in part on LQI measurements performed on the beam training sequences.

51. The device of claim 50, wherein the wireless network is a wireless personal area network (WPAN) utilizing an IEEE 802.15.3c standard, and wherein the contention free period (CFP) comprises a channel time allocation period (CTAP).

* * * * *